United States Patent
Wu

(10) Patent No.: US 6,442,570 B1
(45) Date of Patent: Aug. 27, 2002

(54) OBJECT IDENTIFICATION AND DATA COMMUNICATION DURING AN OBJECT SYNCHRONIZATION PROCESS

(75) Inventor: Charles Wu, Bellevue, WA (US)

(73) Assignee: Microsoft Corporation, Redmond, VA (US)

(*) Notice: Subject to any disclaimer, the term of this patent is extended or adjusted under 35 U.S.C. 154(b) by 0 days.

(21) Appl. No.: 09/326,754

(22) Filed: Jun. 4, 1999

Related U.S. Application Data

(63) Continuation of application No. 08/958,658, filed on Oct. 27, 1997, now Pat. No. 6,125,369.
(60) Provisional application No. 60/103,856, filed on Oct. 12, 1998.

(51) Int. Cl.[7] .......................... G06F 12/00; G06F 17/30
(52) U.S. Cl. .......................... 707/201; 707/10; 707/103; 707/104.1; 709/219; 709/203; 709/229
(58) Field of Search .......................... 707/10, 201, 103; 709/248, 101, 106, 219

(56) References Cited

U.S. PATENT DOCUMENTS

| | | | | |
|---|---|---|---|---|
| 4,875,159 A | * | 10/1989 | Cary et al. ................ | 364/200 |
| 5,392,390 A | | 2/1995 | Crozier ..................... | 395/161 |
| 5,630,081 A | | 5/1997 | Rybicki et al. ............ | 395/348 |
| 5,684,990 A | | 11/1997 | Boothby .................... | 395/619 |
| 5,701,423 A | | 12/1997 | Crozier ..................... | 395/335 |
| 5,706,509 A | * | 1/1998 | Man-Hak Tso ............ | 395/617 |
| 6,044,381 A | * | 3/2000 | Boothby et al. ........... | 707/201 |
| 6,052,735 A | * | 4/2000 | Ulrich et al. .............. | 709/236 |
| 6,125,369 A | * | 9/2000 | Wu et al. ................... | 707/201 |
| 6,141,664 A | * | 10/2000 | Boothby .................... | 707/201 |

* cited by examiner

*Primary Examiner*—Diane D. Mizrahi
*Assistant Examiner*—Jacques Veillard
(74) *Attorney, Agent, or Firm*—Lee & Hayes, PLLC

(57) ABSTRACT

A synchronization system synchronizes objects between a portable computer and a desktop computer. Prior to synchronization, the system selects objects to be synchronized between the two computers. A synchronization manager in the portable computer calls an object identification function which identifies a volume that is accessible to the portable computer. The object identification function also identifies objects that are associated with the identified volume and that have been modified since previously synchronizing the identified volume. The object identification function then identifies the identified objects to the synchronization manager, which is able to synchronize the identified objects between the portable computer and the desktop computer. The identification of objects is performed for each accessible volume in the portable computer. The system also provides for the communication of arbitrary data between the portable computer and the desktop computer during a synchronization process. The desktop computer requests communication of a particular set of data between the two computers. The particular set of data is not associated with the pre-defined data exchanged during the synchronization process. The set of data is then communicated between the two computers as requested during the synchronization process.

30 Claims, 5 Drawing Sheets

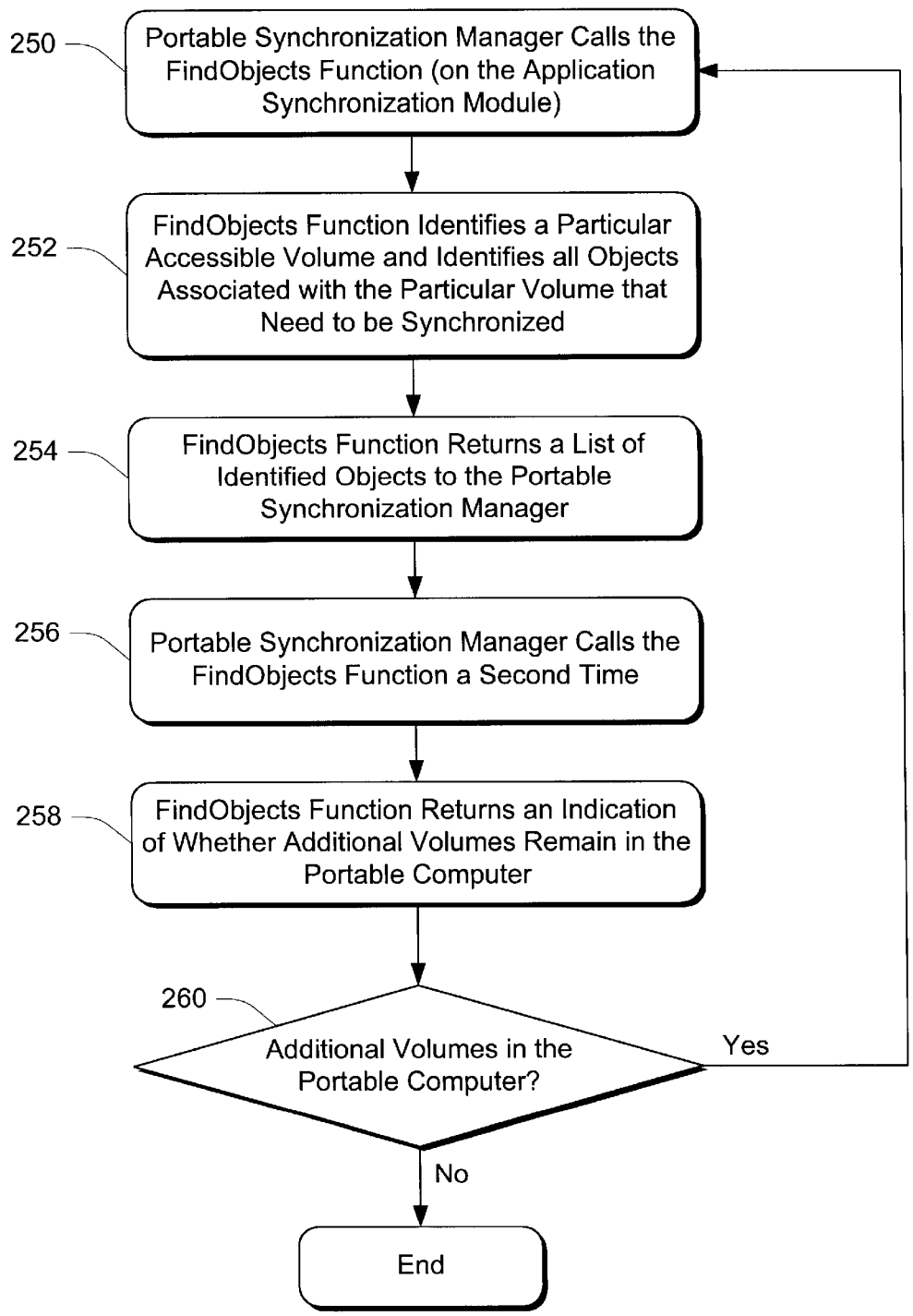

OBJECT IDENTIFICATION AND DATA COMMUNICATION DURING AN OBJECT SYNCHRONIZATION PROCESS

RELATED APPLICATION

This application is a continuation to U.S. patent application Ser. No. 08/958,658, filed Oct. 27, 1997 (now U.S. Pat. No. 6,125,369), entitled "Continuous Object Synchronization Between Object Stores On Different Computers", to Charles Wu and George T. Hu; this application also claims priority to U.S. Provisional Application No. 60/103,856, filed Oct. 12, 1998, entitled "New ActiveSync API (FindObjects, SyncData)", to Charles Wu.

TECHNICAL FIELD

This invention relates to the identification of objects available for synchronization between two computing devices. The invention further relates to the exchange of arbitrary data between the two computing devices during a synchronization process.

BACKGROUND OF THE INVENTION

Laptop, handheld, and other portable computers or computing devices have increased in popularity as the devices have become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on read-only memory (ROM)). Alternatively, one or more application programs may be installed by the user after purchasing the portable computer.

Many of these small computers have limited physical resources. For example, both primary and secondary memory are typically quite limited in comparison to desktop computers. In addition, small computers and other information processing devices often do not accommodate any form of removable mass storage such as floppy disks or optical disks. To make up for this deficiency, such computers are often capable of utilizing the resources of desktop computers or other base computers.

Initially, a base computer (such as a desktop computer) installs application programs on a smaller, more resource-limited portable computer, such as a laptop, handheld, or palmtop computer. Such application programs are typically distributed from their manufacturers on some type of non-volatile storage medium such as a floppy disk or a CD-ROM. Since the portable computer typically has no hardware to read such a storage medium, the portable computer is instead coupled to communicate with the base computer, typically through a serial link. The base computer reads the application program from the non-volatile storage medium and downloads the program to the portable computer.

Portable computers that can receive application programs downloaded from a desktop computer are versatile and allow application programs to be replaced or upgraded easily. Typically, an installation application is run on the desktop computer that allows the user to select one or more application programs for downloading into the portable computer. After selecting the appropriate application programs, the installation application downloads the application programs to the portable computer.

The invention described herein relates to the synchronization of objects, such as databases, stored in portable computers with corresponding objects stored in a base computer. Some portable computers contain a built-in main memory as well as one or more slots or connectors to receive optional removable memory cards. Such memory cards allow a user to increase the memory resources of a portable computer. The additional memory resources can be used for storing one or more objects, storing additional application programs, or executing additional application programs simultaneously. The memory cards are removable from the portable computer, such that the objects or applications stored on the cards will become inaccessible if the card is removed or disconnected from the portable computer. Inaccessible objects cannot be retrieved from the memory card unless the memory card is coupled to the portable computer.

Typically, when a portable computer is synchronized with a base computer, objects that have been modified since the last synchronization process are synchronized such that the portable computer and the base computer contain identical objects. Further, during each synchronization process, if an object has been deleted on the portable computer or the base computer since the last synchronization process, then the corresponding object on the other system is also deleted. To properly synchronize a portable computer with a base computer, the systems must identify all objects that are accessible and have been modified since the last synchronization process.

Some existing devices use a synchronization manager to identify objects modified since the last synchronization process. The synchronization manager knows of all objects stored in the device (i.e., the portable computer or the base computer) and sequentially checks each object to determine whether the object has been modified since the last synchronization process. This sequential check of all objects may be practical in small systems, but is not feasible in large systems with thousands of objects. Further, the sequential check of all objects works when all objects are known to the synchronization manager. However, in devices that have removable memory cards, the synchronization manager may not know what objects are stored on a particular memory card and, therefore, cannot properly check to see if the objects on the memory card have been modified since the last synchronization process.

During a typical synchronization process, data is exchanged between the two devices being synchronized. This data includes control information that coordinates the synchronization process as well as the object data being synchronized. The two devices are typically restricted from exchanging any other data that is not associated with the synchronization process.

Therefore, it is desirable to provide a mechanism that identifies modified objects on a device without requiring a sequential check of every possible object. Additionally, it is desirable to provide a mechanism that allows for the exchange of arbitrary data between two devices during a synchronization process.

SUMMARY OF THE INVENTION

The invention described herein selects objects to be synchronized between a first device, such as a portable computer, and a second device, such as a desktop computer. Rather than performing a sequential check of all possible objects stored in the first device, the invention allows a synchronization manager in the first device to call a function that returns all objects in a particular volume that require synchronization. Additionally, the invention allows the two devices to exchange arbitrary data during a synchronization process, rather than limiting the devices to exchanging data related to the synchronization process.

In a particular implementation of the invention, a synchronization manager in the first device calls an object identification function. In response to being called, the object identification function identifies a first volume that is accessible to the first device. The object identification function also identifies objects associated with a first volume that have been modified since previously synchronizing the first volume. Next, the object identification function identifies the identified objects to the synchronization manager, which is then able to synchronize the identified objects between the first device and the second device.

In another implementation of the invention, when the object identification function is called a second time, the object identification function releases resources used during the first call of the object identification function and returns an indication of whether additional volumes are accessible to the first device.

Using another aspect of the invention, arbitrary data is communicated between a portable computer and a desktop computer during a synchronization process. The synchronization process causes the exchange of pre-defined data between the portable computer and the desktop computer. A data communication function is called to request communication of a particular set of data between the portable computer and the desktop computer. The particular set of data is not associated with the pre-defined data exchanged during the synchronization process. In response to being called, the data communication function communicates the particular set of data between the portable computer and the desktop computer.

BRIEF DESCRIPTION OF THE DRAWINGS

FIG. 5 is a flow diagram illustrating an exemplary procedure for identifying objects available for synchronization between two devices.

DETAILED DESCRIPTION

Figure 1:
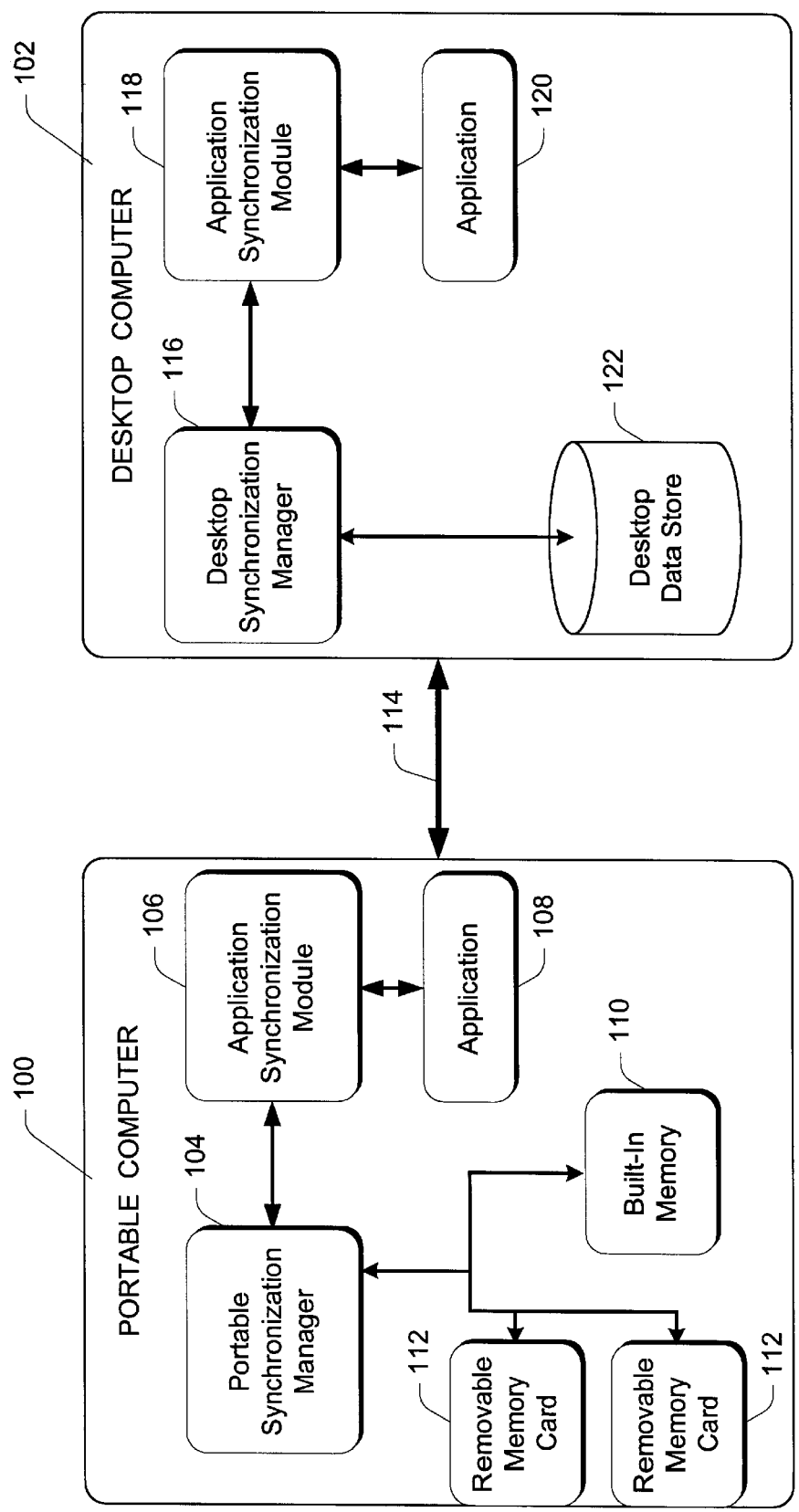
FIG. 1 illustrates an exemplary portable computer and an exemplary base computer in accordance with the invention.

FIG. 1 illustrates an exemplary portable computer 100 and an exemplary desktop computer 102 in accordance with the invention. Desktop computer 102 is also referred to herein as a "base computer." Portable computer 100 can be any type of laptop, palmtop, handheld, or other computing device capable of receiving application programs from a base computer such as desktop computer 102.

Portable computer 100 includes a portable synchronization manager 104, which is responsible for coordinating synchronization of objects stored on the portable computer with corresponding objects on base computer 102. An object can be a database or any other data structure capable of being synchronized between two computing devices and/or storage devices. Each object contains multiple data items (also referred to as "data entries" or "records"). The term "synchronization" refers to a process in which changes to one database are automatically reflected in one or more separately stored copies of the database. In the described embodiment, synchronization involves two copies of a database, each containing multiple corresponding entries, items, or records. Changes might be made to an entry in one of the database copies. During synchronization, those changes are implemented on the corresponding entry residing on the other database copy. If the same entry has been changed on both databases, the user is prompted to resolve the conflict by selecting one of the different versions of the entry to discard. When a new entry is created in one of the databases, it is duplicated on the other database during synchronization. When an entry is deleted from one database, it is deleted from the other database during synchronization.

The base computer and portable computer are each capable of executing multiple different application programs. Different object types can be associated with each application. For example, a personal contact manager application utilizes an associated object which is a database containing contact information accessed by the contact manager application. Depending on the number of contact entries, the contact manager application may create multiple objects (i.e., multiple databases)—one for each category of contacts. In a particular example, the contact manager application creates two objects, one for storing personal contact information and another for storing work-related contact information.

Portable computer 100 includes a limited amount of built-in memory 110 as well as one or more removable memory cards 112. Removable memory cards 112 may also be referred to as "storage cards" or "memory expansion units." A portion of built-in memory 110 is addressable memory for program execution, and the remaining portion is used to simulate secondary disk storage. The removable memory cards 112 may contain permanently installed applications, such as applications stored in a read-only memory (ROM), not shown. Additionally, a removable memory card 112 may contain non-volatile memory for storing objects (such as databases) or downloaded application programs, thereby supplementing built-in memory 110. Memory cards 112 allow the user of portable computer 100 to customize the device by adding application programs or adding memory for storing additional objects and downloading additional application programs.

Portable computer 100 typically contains one or more applications 108. Applications 108 may include word processing applications, spreadsheet applications, contact manager applications, and game applications. Although shown as a separate block in FIG. 1, each application 108 is stored in built-in memory 110 or in a removable memory card 112. For each application 108 executing on portable computer 100, an application synchronization module 106 is provided. The application synchronization module 106 is familiar with the objects used by the associated application 108. This object knowledge is used by application synchronization module 106 and communicated to portable synchronization manager 104 during the synchronization process.

Each storage device in portable computer 100 is divided into one or more storage volumes. A storage volume contains one or more objects capable of being synchronized with corresponding objects in the base computer 102. In one embodiment, the operating system of the portable computer 100 or the base computer 102 is responsible for creating and defining storage volumes. Input from the user of the portable computer or base computer can influence the creation and definition of storage volumes. In other embodiments, the application synchronization module 106 is responsible for creating and defining storage volumes based on its knowledge of the associated application 108.

In an exemplary portable computer 100, a removable memory card 112 is represented as a single storage volume and contains one object—a database used by a contact manager application. Another removable memory card 112 in the portable computer 100 is also represented as a single storage volume, but contains multiple objects, such as a separate object for each stock portfolio database used by a portfolio tracking application. The built-in memory 110 of the portable computer 100 is divided into three storage volumes, in which each storage volume is used by a different type of application (e.g., an appointment application, a task list application, and a notepad application).

Each storage volume is assigned a globally unique identifier (GUID)—also referred to as a universally unique identifier (UUID). The assignment of a GUID is necessary to properly track all storage volumes that may become accessible to the portable computer. In one implementation of the invention, the GUID is a 16 byte identifier generated by the operating system upon creation of the storage volume. In addition to the GUID, each storage volume typically has a name (such as a file name) that is not necessarily unique. Thus, two different memory cards may be named "stock$_{13}$ portfolios", but the two memory cards will have different GUIDs. In addition to volume identifiers, each object has an associated object identifier. Each object stored on the portable computer 100 has an associated identifier and each object stored on the base computer 102 has an associated identifier. Typically, the two object identifiers are not identical, thereby requiring a mapping table or similar mechanism for correlating the two object identifiers. Although the volume identifiers are unique, the individual objects stored on the storage volumes do not require unique identifiers.

Portable computer 100 is designed to take advantage of a base computer's hardware resources. Particularly, portable computer 100 is designed so that application programs and other data can be read from a distribution medium by base computer 102, and then downloaded to portable computer 100. Portable computer 100 is thus referred to as a peripheral computer or an auxiliary computer, in that it is controlled during this process by base computer 102.

To allow communications between base computer 102 and portable computer 100, the two computers are coupled to one another through a communication link 114. Typically, communication link 114 is a temporary bidirectional communication link established to exchange data between portable computer 100 and base computer 102. Communication link 114 is used, for example, to synchronize objects between base computer 102 and portable computer 100. Communication link 114 can also be used to download applications and other data from base computer 102 to portable computer 100. In a particular embodiment, communication link 114 is a serial communication link. However, communication link 114 can utilize any type of communication medium and any type of communication protocol to exchange data between portable computer 100 and base computer 102.

Base computer 102 in the described embodiment is a conventional personal desktop computer. However, other types of computers might be used in this role. Base computer 102 includes a desktop synchronization manager 116, which operates in combination with portable synchronization manager 104 in portable computer 100 to coordinate the synchronization of objects between base computer 102 and portable computer 100. As discussed in greater detail below, desktop synchronization manager module 116 also maintains the status of each storage volume on the portable computer 100. If a particular storage volume in portable computer 100 is not accessible, then desktop synchronization manager 116 does not attempt to synchronize objects stored in the inaccessible volume.

Base computer 102 typically contains multiple applications 120. Applications 120 may include applications similar to applications 108 stored on portable computer 100 as well as other applications not associated with the synchronization process. For each application on base computer 102, an application synchronization module 118 is provided. The application synchronization module 118 is coupled to desktop synchronization manager 116 and its associated application 120. The application synchronization module 118 is familiar with the objects used by the associated application 120. This object knowledge is used by application synchronization module 118 and communicated to desktop synchronization manager 116 during the synchronization process. Base computer 102 also comprises a desktop data store 122 coupled to the desktop synchronization manager 116. Data store 122 stores information necessary to perform the synchronization process, such as the status of each storage volume used with portable computer 100.

Although an object stored on portable computer 100 can be synchronized with a corresponding object on base computer 102, the two objects do not necessarily share the same data structure or data storage format. For example, an object stored on the portable computer 100 is created using a contact management program proprietary to the manufacturer of the portable computer using the manufacturer's data structure. That object is synchronized with a corresponding object on the base computer 102. The object on the base computer is accessed using an application program different than the contact management program on the portable computer. The base computer application uses a different data structure to store the various information contained in the object. The two application synchronization modules 106 and 118 operate in combination with portable synchronization manager 104 and desktop synchronization manager 116 to ensure that the two objects are properly synchronized and the appropriate data structures are maintained. This may involve translating and/or converting the items or entries in one object to a different format or structure in the corresponding object, such that the corresponding object can be accessed by the appropriate application.

The synchronization process is performed independently of the application programs that create and modify the objects being synchronized. The portable synchronization manager 104 and the desktop synchronization manager 116 do not interpret or understand the data entries contained within the synchronized objects. Therefore, the two synchronization managers 104 and 116 merely ensure that the two objects are properly synchronized. Similarly, the applications 108 and 120 create and modify objects, but do not participate in the synchronization process.

Figure 2:
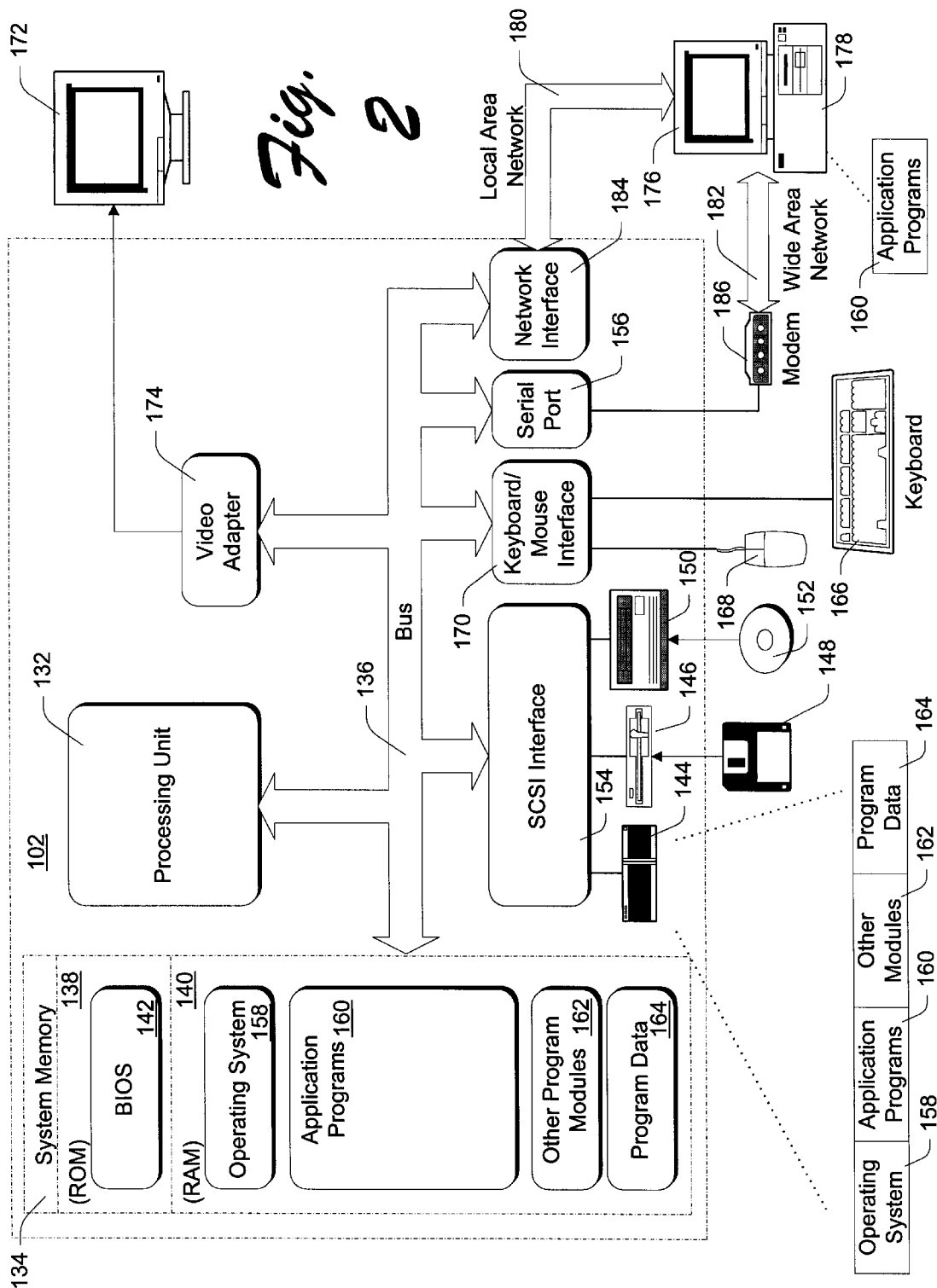
FIG. 2 is a block diagram showing pertinent components of a base computer in accordance with the invention.

FIG. 2 shows a general example of a base computer 102 that can be used in accordance with the present invention. Computer 102 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 102, such as during start-up, is stored in ROM 138.

Computer 102 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 102. Although the exemplary environment described herein employs a hard disk, a removable magnetic disk 148 and a removable optical disk 152, it should be appreciated by those skilled in the art that other types of computer-readable media which can is store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 102 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 102 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 102, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various is times in different storage components of the computer, and are executed by the data processor(s) of the computer.

Figure 3:
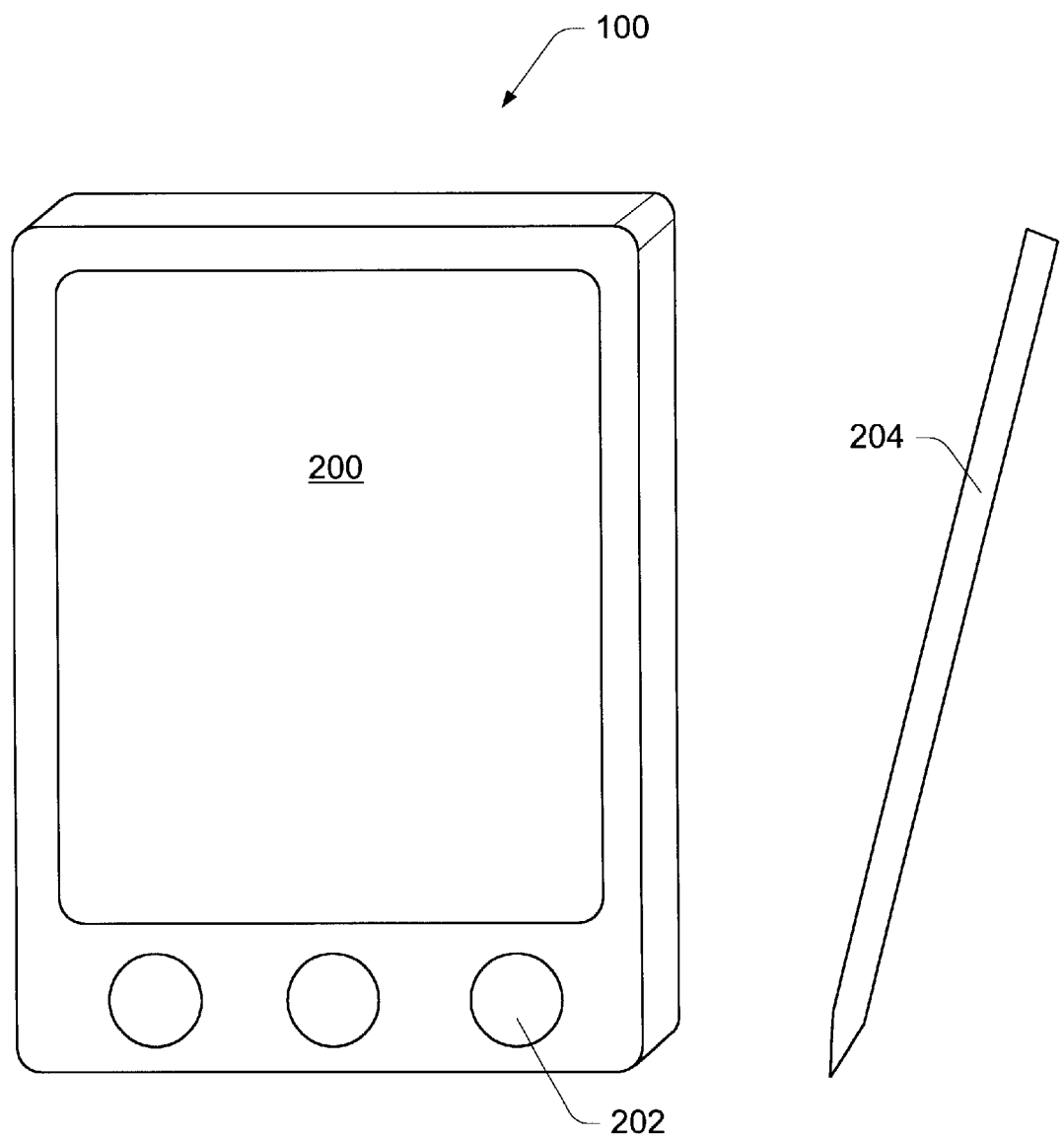
FIG. 3 illustrates an embodiment of a portable computer in accordance with the present invention.

FIG. 3 shows an embodiment of portable computer 100 for use with the present invention. For purposes of this description, the term "portable" is used to indicate a small computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like. In other implementations, the portable computer may be implemented as a personal digital assistant (PDA), a personal organizer, a palmtop (or handheld) computer, a computerized notepad, or the like.

Figure 4:
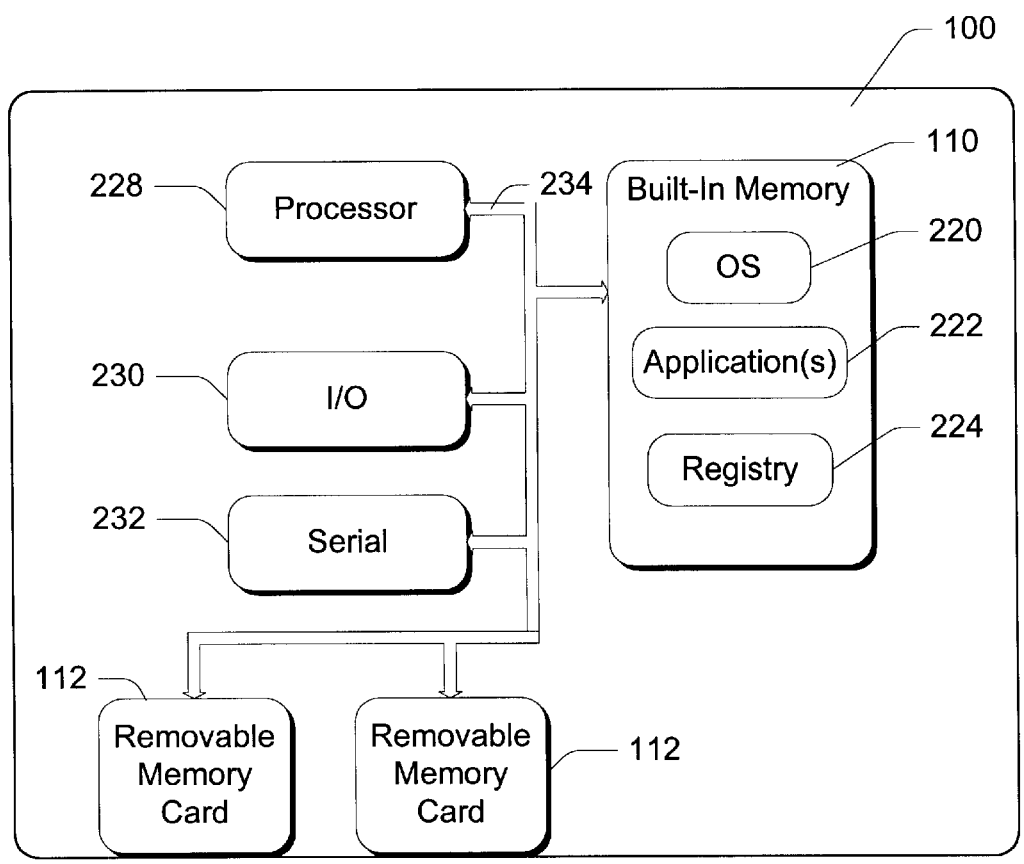
FIG. 4 is a block diagram illustrating pertinent components of a portable computer in accordance with the invention.

Portable computer 100 includes an LCD display 200 and several user input keys or buttons 202. The LCD display 200 is a touch-sensitive screen which, when used in conjunction with a stylus 204, allows a user to input information to portable computer 100. The stylus 204 is used to press the display at designated coordinates for user input. Buttons 202 provide another mechanism for user input. A particular portable computer may have any number of buttons for user input. Although not shown in FIG. 3, portable computer 100 also includes one or more slots or other connectors capable of receiving removable memory cards 112. FIG. 4 is a block diagram illustrating pertinent components of the portable computer 100. Portable computer 100 includes built-in memory 110 and one or more removable memory cards 112. Built-in memory 110 includes an operating system 220, one or more application programs 222, and a registry 224. Additionally, portable computer 100 has a processor 228, I/O components 230 (including the display 200 and buttons 202 in FIG. 3), and a serial interface 232 for communicating with other computing devices (such as base computer 102 or another portable computer 100). In one embodiment, the various components in portable computer 100 communicate with one another over a bus 234. In an exemplary embodiment of portable computer 100, built-in memory 110 is a non-volatile electronic memory such as a random access memory (RAM) with a battery back-up module, not shown. In an alternate embodiment, built-in memory 110 is implemented using a flash memory device. Part of this built-in memory 110 is addressable memory for program execution, and the remaining part is used to simulate secondary disk storage.

Operating system 220 executes on processor 228 from built-in memory 110

In a particular embodiment of the invention, portable computer 100 runs the "Windows CE" operating system manufactured and distributed by Microsoft Corporation of Redmond, Washington. This operating system is particularly designed for small computing devices.

Application programs 222 execute from built-in memory 110 of portable computer 100. The number of application programs 222 that can be simultaneously installed on portable computer 100 is a function of the portion of built-in memory allocated to store application programs and the size of the application programs 222 currently installed. In addition, application programs can be installed on removable memory cards 112 as described below.

The registry 224 is a database that is implemented in various forms under different versions of the "Windows" operating systems. The registry contains information about applications stored on portable computer 100. Exemplary registry information includes user preferences and application configuration information.

FIG. 5 is a flow diagram illustrating an exemplary procedure for identifying objects available for synchronization between two devices. Before the actual synchronization of objects can begin, the system must identify objects that have been modified since the last synchronization process. The portable synchronization manager 104 in the portable computer 100 uses a function (referred to herein as the FindObjects function, or generally as an object identification function) to identify objects on the portable computer that have been modified since the last synchronization process. At step 250, the portable sychronization manager 104 calls the FindObjects function, which resides on the application synchronization module 106. The FindObjects function identifies a particular accessible volume in portable computer 100 and identifies all objects associated with the particular volume that need to be synchronized (step 252). The objects that need to be synchronized are those that have been modified since previously synchronizing the particular volume. Next, the FindObjects function returns a list of the objects identified in step 252 to the portable synchronization manager 104 (step 254). Step 254 also returns the Volume ID of the particular volume with which the objects are associated.

At step 256, the portable synchronization manager 104 calls the FindObjects function for a second time. This second call allows the application synchronization module 104 to release resources by deleting the list of objects identified as a result of the first function call. The second call of the FindObjects function also causes the function to determine whether additional volumes remain on the portable computer 100 that may contain objects that require synchronization. The second call of the function returns an indication of whether additional volumes remain (step 258). Decision block 260 branches back to step 250 if additional volumes remain in the portable computer. Otherwise, the procedure terminates, thereby allowing the object synchronization process to begin.

Each subsequent function call performed in step 250 causes the FindObjects function to identify objects in the next volume in portable computer 100 that need to be synchronized. When all volumes in portable computer 100 have been analyzed by the FindObjects function, then the second call of the function (step 256) returns an indication that all volumes have been analyzed, thereby indicating that all objects that require synchronization have been identified and returned to the portable synchronization manager.

The FindObjects function provides an improved mechanism for identifying objects that require synchronization. Instead of sequentially checking every object on every volume, the portable synchronization manager simply calls the FindObjects function, which identifies the volumes in the portable computer 100 and the objects on those volumes that require synchronization. Thus, the portable synchronization manager is not concerned with which volumes are currently coupled to the portable computer or which objects are stored on those volumes. Instead, the portable synchronization manager collects the list of identified objects and oversees the synchronization of those objects with the computer 102.

An example structure of the FindObjects function is provided below.

```
HRESULT FindObjects (PFINDOBJINFO)
typedef struct tagFindObjInfo
{
    UINT          uFlags;
    OBJTYPENAME   szObjType;
    UINT          *poid;
    UINT          cUnChg;
    UINT          cChg;
    LPBYTE        lpbVolumeID;
    UINT          cbVolumeID;
    LPVOID        lpvUser;
} FINDOBJINFO, *PFINDOBJINFO;
```

In the example structure of the FindObjects function above, uFlags contains flags that indicate, for example, whether additional volumes remain to be analyzed for objects that require synchronization. SzObjType is a text stream indicating the type of objects being identified (e.g., objects associated with a calendar application, a task application, or an email application). *poid is a pointer to a list of object IDs. The list of object IDs contains all objects stored on a particular volume. The list of object IDs is arranged such that objects that have not changed since the last synchronization process are located at the beginning of the list and objects that have changed are located after the unchanged objects. cUnChg indicates how many of the entries in the list of object IDs are unchanged since the last synchronization process. For example, if cUnChg is twenty, then the first twenty entries in the list of object IDs have not changed since the last synchronization process. cChg indicates the number of entries in the list of object IDs that have changed since the last synchronization process. For example, if cChg is ten, then the next ten entries in the list of object IDs have changed since the last synchronization process. lpbVolumeID is a pointer to the Volume ID with which the list of object IDs are associated. cbVolumeID indicates the number of bytes in the Volume ID. lpvUser is a pointer to, for example, a volume or database handle that gets passed back during the second call of the function to release resources.

As discussed above, during a typical synchronization process, data is exchanged between the two computing devices being synchronized. The data exchanged includes control information that coordinates the synchronization process as well as the object data being synchronized. However, the present invention allows other types of data, unrelated to the synchronization process, to be exchanged between the two computing devices. This "arbitrary" data can be exchanged, for example, using a function referred to herein as the SyncData function, or generally as a data communication function. The arbitrary data can be any type of data represented by any number of bytes. For example, the arbitrary data can be the birthday of an individual stored in a contact manager application that does not typically support birthday information. This birthday information can be stored for any number of individuals in the contact manager application.

The SyncData function is called by the desktop computer 102 to either send data to the portable computer 100 or retrieve data from the portable computer. When the desktop computer 102 calls the SyncData function, the call includes a parameter that indicates whether data is being retrieved from the portable computer 100 or sent to the portable computer. If the desktop computer is requesting data from the portable computer, then the data is not returned from the portable computer until the requested data is available to the portable computer. For example, if the portable computer is waiting to receive the requested data or waiting for access to the requested data, the data cannot be returned to the desktop computer until the portable computer itself has access to the data.

An example structure of the SyncData function is provided below.

```
HRESULT SyncData (PSDREQUEST)
typedef struct tagSDREQUEST
{
        OBJTYPENAME   szObjType;
        BOOL          fSet;
        UINT          ucode;
        LPBYTE        lpbData;
        UINT          cbData;
} SDREQUEST, *PSDREQUEST;
```

In the example structure of the SyncData function above, szObjType is a text stream indicating the type of objects being synchronized (e.g., objects associated with a calendar application, a task application, or an email application). fSet determines whether the data is being sent to the portable computer or retrieved from the portable computer. If fSet is true, data is sent from the desktop computer to the portable computer. If fset is false, data is retrieved from the portable computer to the desktop computer. uCode identifies the type of data (e.g., contact name, contact phone number, or task priority) being synchronized. lpbData is a pointer to the beginning of the data being sent or ret retrieved. cbData indicates the number of bytes of data to be sent or retrieved (i.e., the number of data bytes beyond the pointer lpbData).

Thus, as described above, the invention provides a system and method for identifying objects that require synchronization between two computing devices. The objects on all volumes are identified, including removable volumes. The portable synchronization manager is not required to have knowledge of removable volumes or the objects stored on those removable objects. Instead of requiring the portable synchronization manager to sequentially check or query every possible object on the portable computer, the portable synchronization manager executes multiple calls to the FindObjects function which returns objects associated with a articular volume that require synchronization. Also described above is a syncData function that allows arbitrary data to be exchanged during a synchronization process. Thus, the desktop and portable computers are not limited to exchanging data relating to the actual synchronization process. Instead, the desktop and portable computers can exchange any information desired using the SyncData function.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of selecting objects to be synchronized between a first device and a second device, the method comprising:

calling an object identification function from a synchronization manager in the first device;

in response to being called, the object identification function identifying a first volume that is accessible to the first device and identifying objects associated with the first volume that have been modified since previously synchronizing the first volume; and the object identification function identifying the identified objects to the synchronization manager, wherein the synchronization manager is configured to synchronize the identified objects between the first device and the second device.

2. The method as recited in claim 1, wherein the synchronization manager does not identify the first volume to the object identification function.

3. The method as recited in claim 1, wherein the method is performed for each volume that is currently accessible to the first device.

4. The method as recited in claim 1, wherein the object identification function also returns a volume ID.

5. The method as recited in claim 1, wherein the method is performed for each volume that is currently accessible to the first device, wherein the object identification function further identifies a next volume in the first device.

6. The method as recited in claim 1, wherein the objects are databases.

7. The method as recited in claim 1, wherein the first device is a portable computing device.

8. The method as recited in claim 1, wherein the second device is a desktop computer.

9. The method as recited in claim 1, further comprising calling the object identification function a second time to identify additional volumes that are accessible to the first device.

10. The method as recited in claim 1, further comprising:

calling a data communication function to request communication of a particular set of data between the first device and the second device, wherein the particular set of data is not associated with any pre-defined data exchanged during a synchronization process; and in response to being called, the data communication function communicating the particular set of data between the first device and the second device.

11. One or more computer-readable memories containing a computer program that is executable by a processor to perform the method recited in claim 1.

12. A method of communicating data between a portable computer and a desktop computer during a synchronization process, wherein the synchronization process causes the exchange of pre-defined data between the portable computer and the desktop computer, the method comprising:

calling a data communication function to request communication of a particular set of data between the portable computer and the desktop computer, wherein the particular set of data is not associated with the pre-defined data exchanged during the synchronization process; and in response to being called, the data communication function communicating the particular set of data between the portable computer and the desktop computer.

13. The method as recited in claim 12, wherein the step of calling a data communication function is performed by the desktop computer.

14. The method as recited in claim 12, wherein the call to the data communication function includes a parameter that indicates whether the particular set of data is to be communicated from the desktop computer to the portable computer or from the portable computer to the desktop computer.

15. The method as recited in claim 12, further comprising:
    calling an object identification function from a synchronization manager in the portable computer;
    in response to being called, the object identification function identifying objects that have been modified since a previous synchronization cycle; and
    the object identification function identifying the identified objects to the synchronization manager.

16. One or more computer-readable memories containing a computer program that is executable by a processor to perform the method recited in claim 12.

17. One or more computer-readable media having stored thereon a
    computer program comprising the following steps:
    receiving a request to identify objects that have been modified since a previous object synchronization process, wherein the request is generated by a synchronization manager;
    identifying objects that have been modified since a previous object synchronization process; and
    identifying the identified objects to the synchronization manager, wherein the synchronization manager is configured to synchronize the identified objects between a first device and a second device.

18. One or more computer-readable media as recited in claim 17, wherein the objects are stored on a plurality of volumes in the first device, and wherein the steps are performed for each volume that is currently accessible to the first device.

19. One or more computer-readable media as recited in claim 17, wherein the step of identifying objects that have been modified since a previous synchronization process further comprises identifying a volume associated with the identified objects.

20. One or more computer-readable media as recited in claim 17, wherein the synchronization manager does not identify the location of the objects to be identified.

21. One or more computer-readable media as recited in claim 17, further comprising receiving a second request to identify objects, wherein the second request to identify objects identifies additional volumes that are accessible to the first device.

22. One or more computer-readable media as recited in claim 17, further comprising identifying a volume ID to the synchronization manager.

23. One or more computer-readable media as recited in claim 17, further
    requesting communication of a particular set of data between the first device and the second device, wherein the particular set of data is not associated with any pre-defined data exchange during a synchronization process; and
    communicating the particular set of data between the first device and the second device.

24. An apparatus comprising:
    a communications interface;
    a synchronization manager coupled to the communications interface, wherein the synchronization manager is configured to synchronize e objects between the apparatus and a computing device; and
    an application synchronization module having a function that is callable by where synchronization manager, wherein the application synchronization module responds by identifying objects that have been modified since a previous synchronization process, and wherein the application synchronization module is further configured to identify the identified objects to the synchronization manager.

25. An apparatus as recited in claim 24, wherein the apparatus is a portable computing device.

26. The apparatus as recited in claim 24, wherein the computing device is a desktop computer.

27. The apparatus as recited in claim 24, wherein the function also returns a volume ID.

28. The apparatus as recited in claim 24, further comprising:
    calling a data communication function to request communication of a particular set of data between a first device and a second device, wherein the particular set of data is not associated with any pre-defined data exchanged during a synchronization process; and
    in response to being called, the data communication function communicating the particular set of data between the first device and the second device.

29. One or more computer-readable media having stored thereon a computer program comprising the following steps:
    accepting a function call that activates an associated function;
    returning a set of parameters, the set of parameters comprising:
        an indicator of whether additional volumes remain to be analyzed for objects that require synchronization;
        an indicator of the type of object being identified;
        a pointer to a list of object IDs stored on a particular volume;
        an indicator of which objects in the list of object IDs have changed since previously synchronizing the particular volume;
        an indicator of a volume ID of the particular volume; and
        a pointer to the particular volume.

30. One or more computer-readable media having stored thereon a computer program comprising the following steps:
    accepting a set of parameters, the set of parameters comprising:
        a direction indicator indicating whether data is to be communicated from a first device to a second device or from the second device to the first device;
        an indicator of the type of data to be communicated between the first device and the second device;
        a pointer identifying the beginning of the data to be communicated; and
        an indicator of the number of bytes of data to be communicated
    returning the identified data to the first device or the second device depending on the direction indicator.

* * * * *

UNITED STATES PATENT AND TRADEMARK OFFICE
CERTIFICATE OF CORRECTION

PATENT NO.    : 6,442,570 B1
DATED         : August 27, 2002
INVENTOR(S)   : Wu

It is certified that error appears in the above-identified patent and that said Letters Patent is hereby corrected as shown below:

Column 5,
Lines 26 and 27, replace ""stock13 portfolios"" with -- "stock_portfolios" --.

Column 7,
Line 24, delete "is" between "can" and "store".

Column 9,
Line 32, replace "sychronization" with -- synchronization --.

Column 11,
Line 42, replace "fset" with -- fSet --,
Lines 45 and 46, replace "be ginning" with -- beginning --.
Line 46, delete "ret" between "or" and "retrieved.".
Line 61, replace "syncData" with -- SyncData --.

Column 13,
Line 60, insert -- comprising: -- after "further".
Line 64, replace "exchange" with -- exchanged --.

Column 14,
Line 5, delete "e" between "synchronize" and "objects".
Line 9, replace "where" with -- the --.

Signed and Sealed this

Eighteenth Day of March, 2003

JAMES E. ROGAN
*Director of the United States Patent and Trademark Office*